(12) United States Patent
Schroeder

(10) Patent No.: US 6,786,468 B2
(45) Date of Patent: Sep. 7, 2004

(54) UNIBODY VALVE AND TECHNIQUES FOR MAKING SAME FOR A PURGE CONTROL DEVICE

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 155 days.

(21) Appl. No.: 10/265,968

(22) Filed: Oct. 7, 2002

(65) Prior Publication Data

US 2004/0065858 A1 Apr. 8, 2004

(51) Int. Cl.[7] ............................................. F16K 31/02
(52) U.S. Cl. ................................. 251/129.17; 251/331
(58) Field of Search ..................... 251/129.01–129.22, 251/318–334, 335.1–335.3

(56) References Cited

U.S. PATENT DOCUMENTS

| | | | | |
|---|---|---|---|---|
| 4,390,157 | A | * 6/1983 | Meckstroth | 251/30.02 |
| 4,612,664 | A | * 9/1986 | Walsh et al. | 381/70 |
| 5,139,226 | A | * 8/1992 | Baldwin et al. | 251/129.2 |
| 5,323,999 | A | * 6/1994 | Bonne et al. | 251/11 |
| 5,649,687 | A | * 7/1997 | Rosas et al. | 251/129.15 |
| 5,671,905 | A | * 9/1997 | Hopkins, Jr. | 251/129.01 |
| 6,293,261 | B1 | 9/2001 | Oemcke et al. | |
| 6,347,616 | B1 | 2/2002 | Rodriguez et al. | |
| 6,453,885 | B1 | 9/2002 | Short | |
| 6,460,517 | B1 | 10/2002 | Dauer | |
| 6,578,564 | B2 | 6/2003 | Bagnasco | |
| 6,631,883 | B1 | * 10/2003 | Van Den Brink | 251/129.01 |
| 6,676,106 | B2 | * 1/2004 | Swartz et al. | 251/129.01 |

OTHER PUBLICATIONS

*Revolution in Zinc Casting*; by William Mihaichuk, Eastern Alloys, Inc., Maybrook, NY; Reprinted from Machine Design, Dec. 8, 1988 (4 pgs).

*Zinc Alloy Properties Guide*; as produced by Eastern Alloys, Inc., Maybrook, NY; May 2001 (4 pgs.).

* cited by examiner

*Primary Examiner*—Paul J. Hirsch
(74) *Attorney, Agent, or Firm*—Jimmy L. Funke

(57) ABSTRACT

A valve and method of constructing same for a purge control device are provided. The valve includes an integral body. The valve further includes a resilient member inserted into the integral body. The resilient member is electromagnetically responsive so that the member can be selectively actuated between respective open and close conditions. An electromagnetic actuator is affixed to the integral body to generate an electromagnetic field for selectively actuating the resilient member between the open and closed conditions. The mass of the resilient member is sufficiently low so that the level of noise produced by the valve is correspondingly low.

22 Claims, 2 Drawing Sheets

UNIBODY VALVE AND TECHNIQUES FOR MAKING SAME FOR A PURGE CONTROL DEVICE

BACKGROUND OF THE INVENTION

The present invention is generally related to purge control devices, and, more particularly, to a unibody electromagnetic valve for controlling the flow of fuel vapors. The invention is further related to valve-constructing techniques that enable to produce a valve with low acoustic noise and reduced permeability relative to the fuel vapors passing through the valve.

Environmental regulations for automotive-related emissions have been evolving over the years to more rigorously prescribe the levels of emissions that may be discharged into the atmosphere, such as fuel vapors that may accumulate in the fuel tank of an automobile. Accordingly, evaporative systems for reducing the discharge of these vapors into the atmosphere have to accurately meet such regulations. At the same time, the evaporative systems should be reliably and affordably constructed to enable suppliers in the automotive industry to successfully compete in the marketplace.

Known purge control devices generally use an assembly of many discrete parts, which incrementally add to the cost and weight of the device and tend to adversely impact the overall reliability of the device. FIG. 1 illustrates one known purge control device 10 including a solenoid valve 12 having a relatively heavy plunger 14. The valve may operate using pulse width modulation (PWM) techniques at a preset frequency, such as 16 Hz. Although the valve provides appropriate flow control to the fuel vapors that pass therethrough, this type of valve may generate objectionable levels of acoustic noise during its operation. Most customers view low noise as a desirable feature in automotive applications, and, consequently, the ability to provide a valve that in operation has low levels of acoustic noise is a very desirable feature for suppliers of automotive components, such as the assignee of the present invention.

The body of a valve, such as that illustrated in FIG. 1, is generally made from plastic, and it is known that there might be some diffusion of fuel vapors through the body of the valve. The level of this diffusion is relatively low and this has not been an issue in view of present environmental regulations. However, it is anticipated that there may be requirements that may be enacted in the future that would mandate eliminating or substantially reducing the levels of such a diffusion.

In view of the foregoing considerations, it would be desirable to provide a valve, such as may be used in a purge control device, that in operation produces relatively low levels of acoustic noise. It would be further desirable to provide a valve made of materials with reduced permeability relative to the fuel vapors passing through the valve. It would be further desirable to provide a valve with fewer parts relative to the number of parts traditionally used in the industry so as to enable incremental cost and weight savings as well as improved reliability.

BRIEF SUMMARY OF THE INVENTION

Generally, the present invention fulfills the foregoing needs by providing in one aspect thereof, a valve for a purge control device. The valve includes an integral body. The valve further includes a resilient member inserted into the integral body. The resilient member is electromagnetically responsive so that the member can be selectively actuated between respective open and close conditions. An electromagnetic actuator is affixed to the integral body to generate an electromagnetic field for selectively actuating the resilient member between the open and closed conditions. The mass of the resilient member is sufficiently low so that the level of noise produced by the valve is correspondingly low.

In another aspect thereof, the present invention further fulfills the foregoing needs by providing a method for constructing a valve for a purge control device. The method allows constructing an integral body. The method further allows inserting a resilient member into the integral body. The resilient member is electromagnetically responsive so that the member can be selectively actuated between respective open and close conditions. An electromagnetic actuator is coupled to the integral body to generate an electromagnetic field for selectively actuating the resilient member between the open and closed conditions. The mass of the resilient member is sufficiently low so that the level of noise produced by the valve is correspondingly low.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
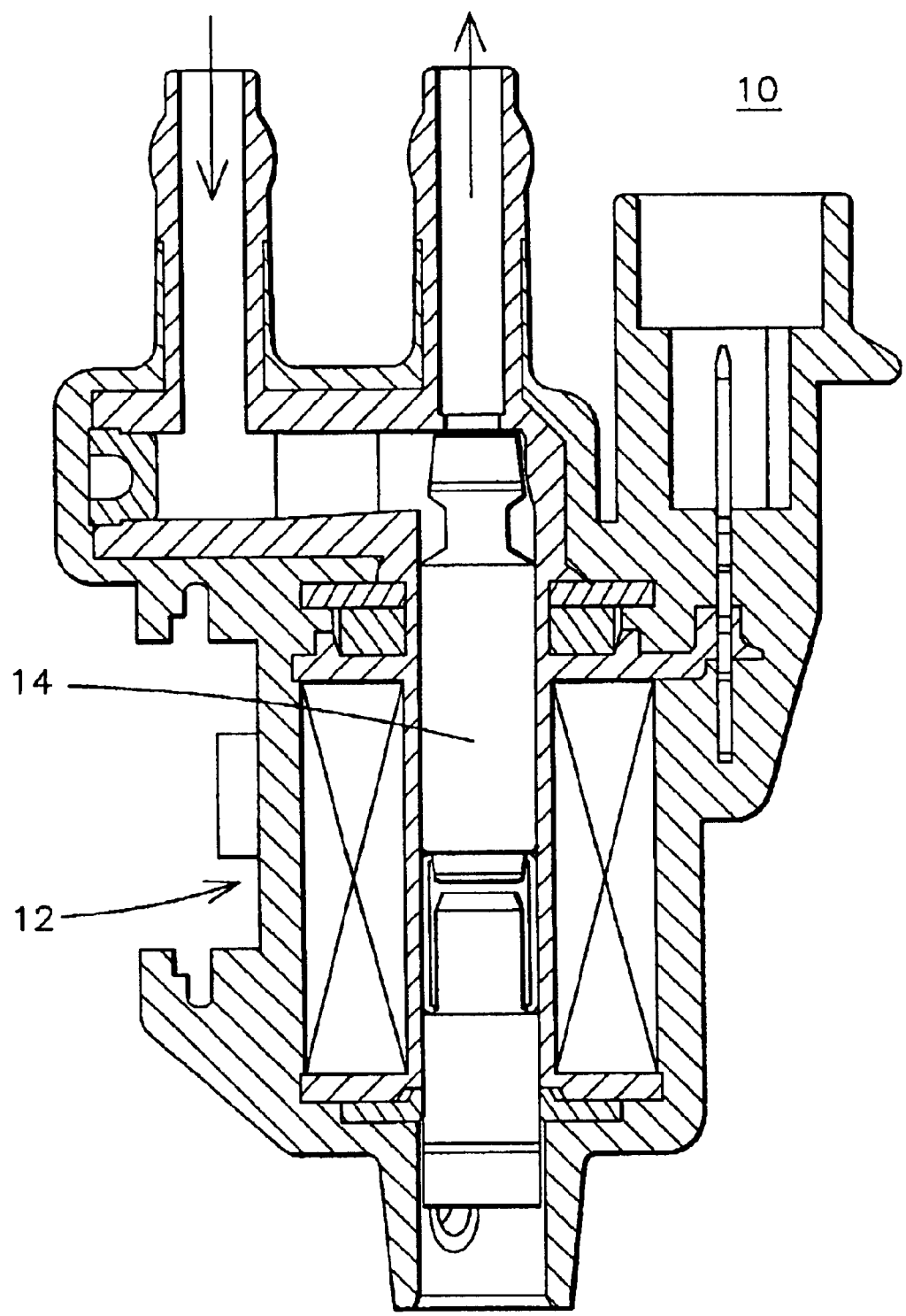
FIG. 1 illustrates one known purge control device to assist the reader understand some of the problems which are overcome in accordance with aspects of the present invention.
Figure 2:
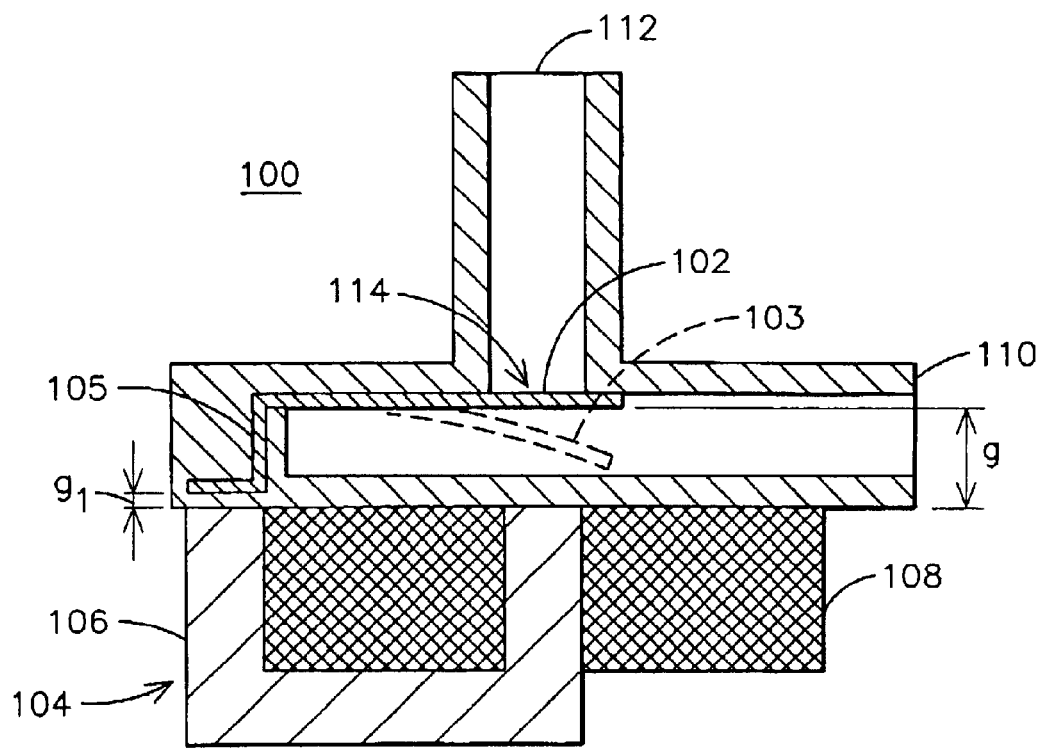
FIG. 2 is a cross-sectional view of one exemplary embodiment of a unibody purge valve embodying a reed valve in accordance with aspects of the present invention.

FIG. 2 is a cross-sectional view of one exemplary embodiment of a unibody purge valve 100 embodying aspects of the present invention. As used herein the expression "unibody" refers to an integral structure for the body of the valve, as opposed to a multi-part body. As shown in FIG. 2, valve 100 includes a normally closed reed 102 that may deflect to an open condition, represented by reed position 103, in response to an appropriate voltage signal connected to an associated electromagnetic reed actuator 104, such as may be made up of an armature 106 and a winding 108. Purge valve 100, in response to the voltage signal applied to actuator 104, allows to selectively communicate an inlet port 110 with an outlet port 112 through an opening 114. In one exemplary embodiment the inlet port may be connected to a canister port, and the outlet port may be connected to the intake manifold of an internal combustion engine. The inlet port in operation may be at atmospheric pressure while outlet port 112 may be at the engine intake manifold pressure (e.g., vacuum). That is, at a pressure less than atmospheric pressure.

The inventor of the present invention has innovatively recognized that lowering the mass of the moving member of the valve may substantially decrease acoustic energy generated by the valve, i.e., noise. The exemplary embodiment illustrated in FIG. 2 comprises a valve wherein reed 114 comprises a generally flexible, resilient ferromagnetic member, such as may be made up of magnetic stainless steel or other such materials. In one exemplary embodiment, the body of the valve comprises a unibody construction that may be made of plastic or any other suitable polymer material using standard molding or injection techniques. To simplify the manufacturing process, the reed may be insert molded into the body of the valve. As can be appreciated in FIG. 2, the reed 102 may include a step-wise structure 105 that allows for even a more secure mechanical connection of the reed relative to the body of the valve. The step-wise structure also provides an advantage from an electromagnetic point of view being that such step-wise structure effectively decreases the air gap $g_1$ between the reed and the armature and consequently the sensitivity of the reed to the electromagnetic actuator is enhanced. The solenoid actuator 104 may be externally affixed to the body of the valve using standard techniques for affixing a solenoid relative to a plastic body.

In another exemplary embodiment, the body of the valve may be produced using Zinc-casting techniques, such as may be commercially available from Fishercast Div. Of Fisher Gauge Limited, Canada, or injection molding of thixotropic semi-solid alloy available from Thixomat of Ann Arbor, Mich., USA. As will be appreciated by those skilled in the art, insert molding or insert casting can be highly efficient techniques as compared to more traditional techniques for constructing the valve that rely on the assembly of discrete parts, such as through soldering, connectors, fasteners, adhesives, etc. The benefits of insert molding/ casting over such traditional techniques may include at least the following: reduced assembly and labor cost, reduced size and weight, increased reliability and increased design flexibility. For readers desirous of background information regarding Zinc Casting, see, for example, article titled "Revolution in Zinc Casting" by William Mihaichuk, as reprinted from "Machine Design" Dec. 8, 1988, which article is herein incorporated by reference. As will be appreciated by those skilled in the art, a valve having a metal body would be particularly useful for applications that require stricter control of fuel vapor diffusion through the walls of the valve since a metal valve would have reduced permeability relative to the fuel vapors passing through the valve, as compared to a plastic valve. The use of the expression Zinc Casting is meant to use terminology well-understood in the art of casting and is not meant to limit the invention to the use of zinc material since other metals, such as aluminum, magnesium and alloys, such as Zinc/ aluminum and Zamak alloys could be employed in lieu of zinc.

In one exemplary embodiment in order to keep the length of the air gap g between the tip of the reed and the armature relatively small, it may be desirable to configure the cross section of the canister port rectangular in lieu of circular so that the air gap g corresponds to the smaller dimension of the rectangular cross section. In essence, the aspect ratio of the rectangular cross section would be selected to meet the volumetric flow requirements of the valve while ensuring that the air gap is sufficiently small so that no excessive electromagnetic energy is required to actuate the reed. It will be appreciated that the present invention is not limited to circular or rectangular cross-sections since other configurations, such as elliptical could be used.

Figure 3:
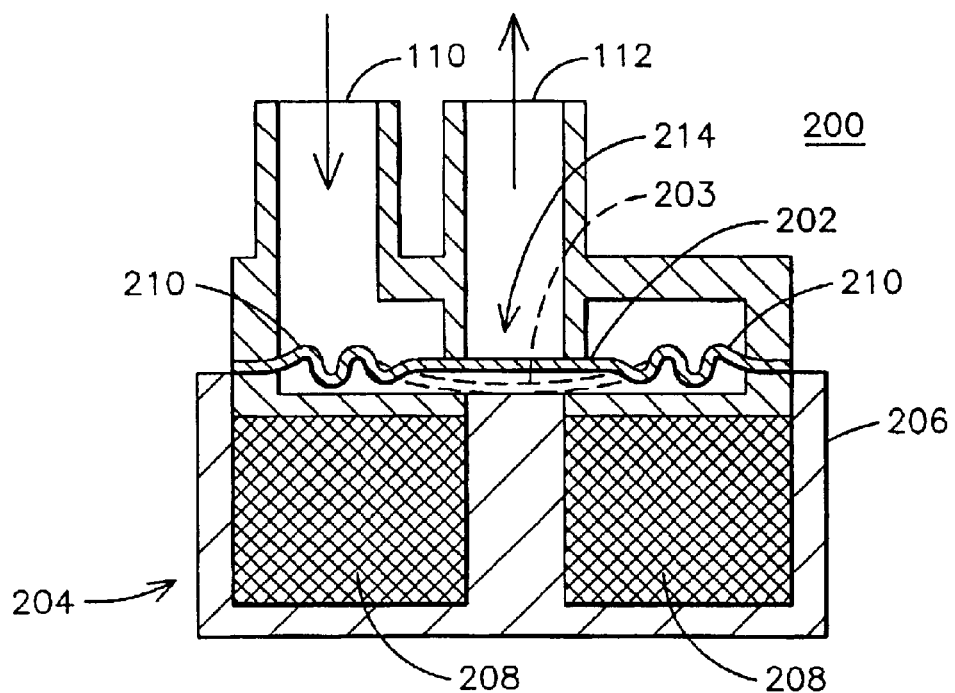
FIG. 3 is a cross-sectional view of another exemplary embodiment of a unibody purge valve embodying a diaphragm valve in accordance with other aspects of the present invention.

FIG. 3 is a cross-sectional view of another exemplary embodiment of a unibody purge valve 200 embodying aspects of the present invention. As shown in FIG. 2, valve 200 includes a normally closed diaphragm 202 that may deflect to an open condition, represented by diaphragm position 203, in response to an appropriate voltage signal connected to an associated electromagnetic diaphragm actuator 204, such as may be made up of an armature 206 and a winding 208. Purge valve 200, in response to the voltage signal applied to actuator 204, allows to selectively communicate the inlet port 110 with the outlet port 112 through an opening 214.

Diaphragm 202 comprises a generally flexible, resilient ferromagnetic member, such as may be made up of magnetic stainless steel or other such materials. As shown in FIG. 3, the diaphragm may be configured to provide a circumferentially-extending spring structure 210 that normally urges the diaphragm against the opening 214, and, in response to the actuating force from the actuator 204, allows the diaphragm to extend to the open condition. As described in the context of FIG. 2, the body of the valve may comprise a unibody construction that may be made of plastic or any other suitable polymer material using standard molding or injection techniques. In this embodiment, the diaphragm may be insert molded into the body of the valve. The diaphragm may include a plurality of anchor holes that would allow the molding or casting material to form an even stronger insert connection.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A valve for a purge control device, the valve comprising:
    an integral body;
    a resilient member inserted into the integral body, the resilient member being electromagnetically responsive so that said member can be selectively actuated between respective open and close conditions;
    an electromagnetic actuator affixed to the integral body to generate an electromagnetic field for selectively actuating the resilient member between the open and closed conditions, the mass of the resilient member being sufficiently low so that the level of noise produced by the valve is correspondingly low.

2. The valve of claim 1 wherein the resilient member comprises a reed.

3. The valve of claim 2 wherein the reed includes a step-wise structure configured to provide anchoring support relative to the integral body.

4. The valve of claim 3 wherein the step-wise structure is further configured to increase the electromagnetic responsiveness of the reed.

5. The valve of claim 1 wherein the resilient member comprises a diaphragm.

6. The valve of claim 5 wherein the diaphragm is configured to define an annular spring for normally urging the diaphragm to the closed condition, the spring being sufficiently expandable to allow the diaphragm to reach the open condition in response to the electromagnetic field from the actuator.

7. The valve of claim 1 wherein the resilient member is connected to the integral body using insert molding techniques.

8. The valve of claim 7 wherein the integral body is made of plastic.

9. The valve of claim 1 wherein the resilient member is connected to the integral body using insert casting techniques.

10. The valve of claim 7 wherein the integral body is made of a metal material being substantially impervious to diffusion of fuel vapors passing through the valve.

11. The valve of claim 9 wherein the metal material is selected from the group consisting of zinc, aluminum, magnesium, and alloys thereof.

12. A method for constructing a valve for a purge control device, the method comprising:
   constructing an integral body;
   inserting a resilient member into the integral body, the resilient member being electromagnetically responsive so that said member can be selectively actuated between respective open and close conditions;
   coupling an electromagnetic actuator to the integral body to generate an electromagnetic field for selectively actuating the resilient member between the open and closed conditions; and
   selecting the mass of the resilient member to be sufficiently low so that the level of noise produced by the valve is correspondingly low.

13. The method of claim 12 wherein the resilient member comprises a reed.

14. The method of claim 13 configuring a step-wise structure in the reed to provide anchoring support relative to the integral body.

15. The method of claim 14 wherein the step-wise structure is further configured to increase the electromagnetic responsiveness of the reed.

16. The method of claim 12 wherein the resilient member comprises a diaphragm.

17. The method of claim 16 further comprising defining an annular spring for normally urging the diaphragm to the closed condition, the spring being sufficiently expandable to allow the diaphragm to reach the open condition in response to the electromagnetic field from the actuator.

18. The method of claim 12 wherein the resilient member is connected to the integral body using insert molding techniques.

19. The method of claim 18 wherein the integral body is made of plastic.

20. The method of claim 12 wherein the resilient member is connected to the integral body using insert casting techniques.

21. The method of claim 20 wherein the integral body is made of a metal material being substantially impervious to diffusion of fuel vapors passing through the valve.

22. The method of claim 20 wherein the metal material is selected from the group consisting of zinc, aluminum, magnesium, and alloys thereof.

* * * * *